J. R. COMBS.
COMPUTING MACHINE.
APPLICATION FILED OCT. 5, 1915.

1,218,376.

Patented Mar. 6, 1917.
8 SHEETS—SHEET 1.

J. R. COMBS.
COMPUTING MACHINE.
APPLICATION FILED OCT. 5, 1915.

1,218,376.

Patented Mar. 6, 1917.
8 SHEETS—SHEET 3.

WITNESSES

INVENTOR
James R. Combs
ATTORNEYS

J. R. COMBS.
COMPUTING MACHINE.
APPLICATION FILED OCT. 5, 1915.

1,218,376.

Patented Mar. 6, 1917.
8 SHEETS—SHEET 7.

WITNESSES

INVENTOR
James R. Combs.

ATTORNEYS

J. R. COMBS.
COMPUTING MACHINE.
APPLICATION FILED OCT. 5, 1915.

1,218,376.

Patented Mar. 6, 1917.
8 SHEETS—SHEET 8.

WITNESSES

INVENTOR
James R. Combs.
ATTORNEYS

UNITED STATES PATENT OFFICE.

JAMES R. COMBS, OF DINSMORE, FLORIDA.

COMPUTING-MACHINE.

1,218,376.     Specification of Letters Patent.     Patented Mar. 6, 1917.

Application filed October 5, 1915. Serial No. 54,165.

*To all whom it may concern:*

Be it known that I, JAMES R. COMBS, a citizen of the United States, and a resident of Dinsmore, in the county of Duval and State of Florida, have invented certain new and useful Improvements in Computing-Machines, of which the following is a specification.

My invention relates to means for mechanically registering the fewest of monetary denominations required to make each of a plurality of individual payments comprised in a total amount, such as the various sums which make up a pay-roll, or, in other words, to determine the total of the largest notes and coins necessary for each of a plurality of individual payments.

The common practice in making up a pay-roll is to mentally calculate the largest notes and coins needed for one payment, write this down, repeat for each component payment of a pay-roll, and totalize; this is not only laborious but it offers opportunity for mistake, and it was in order to overcome this mental labor and liability to error that my invention was conceived.

My present invention is primarily designed for decimal system of currency, and contemplates the use of a counter for each monetary denomination within the limits of the machine, and means controlled by manually operated, numerically designated, elements for actuating said counters, singly or in multiple, to register the largest monetary denominations which equal or most nearly approach the numeral on the particular element manually actuated as, for instance, if the "9" element be so actuated, the "5" counter would advance one degree and the "2" counter would advance two degrees of movement, indicating that a five dollar note and two two dollar notes are the fewest possible notes to make a nine dollar payment.

I may provide the machine as a complete apparatus, or I may provide the same in the form of an attachment for an adding machine of the conventional or other types, whereby the usual operation of the adding machine would actuate my machine to register, in totalizing on the adding machine, the number of notes and coins required of the largest denominations to make each of the amounts composing the total.

I accomplish the desired results by means of cam-bearing elements, either upon rolls or upon plates as will be later explained and as shown in the drawings, and these cams may be of hill and dale form, or zigzag, form, or of both forms, but I may also accomplish the desired results by means of toothed wheels as is also illustrated in the drawings and will be later described.

When my invention is provided as an attachment for an adding machine, the form which will be first described, I prefer to operatively connect the same with the adding machine elements which are initially actuated by the depression of the desired keys preparatory to setting the printing elements, and which initially actuated elements are normally in and always return to zero positions after the printing of each line of numerals, but I do not confine myself to any particular manner of connection with an adding machine in view of the structural differences now existing and which may occur in adding machines of different makes.

In the drawings forming a part of this application, I have shown four cam-bearing elements, as it is unlikely that amounts greater than ninety-nine dollars and ninety-nine cents would occur in a pay-roll, but there is no limitation to the number of such elements which I may employ to meet conditions other than those met with in connection with pay-rolls.

My invention is fully described in the following specification, of which the accompanying drawings form a part, in which like characters refer to like parts in each of the views, and in which:—

Fig. 4 is a development of the four cam-bearing rolls shown in Figs. 1 and 2, and of the cam-bearing plates hereinafter referred to.

Figures 16, 17:
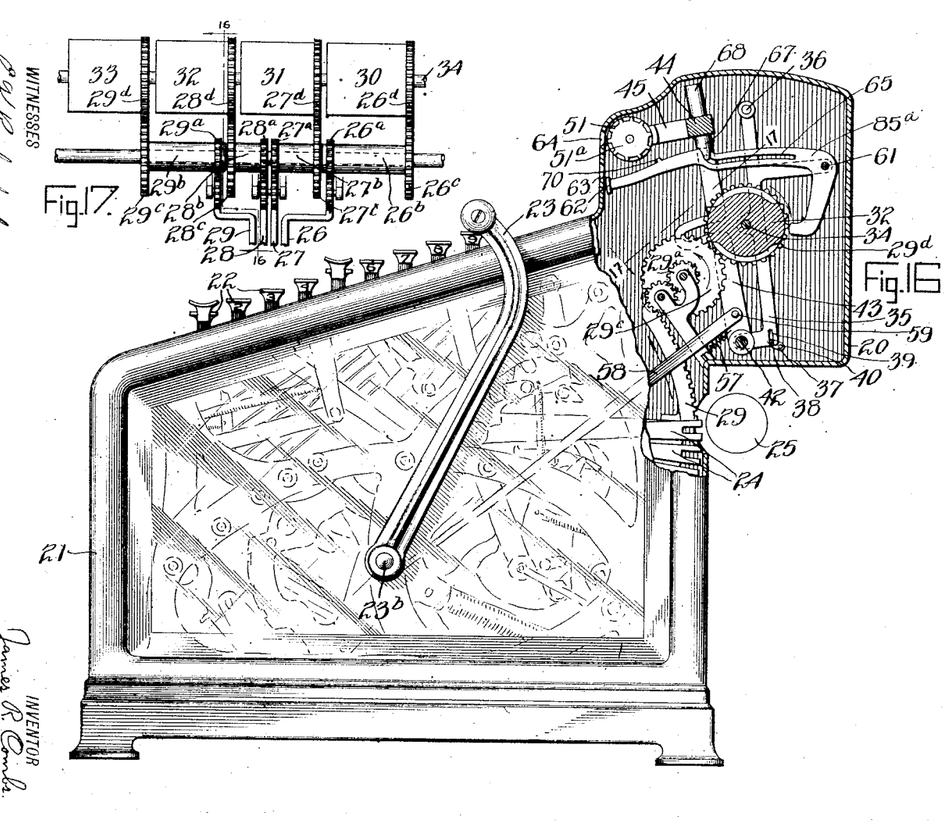
Fig. 16 is a side view of an adding machine provided with my invention as an attachment, and showing one possible means of connection therewith.
Fig. 17 is a partial section taken on the line 17—17 of Fig. 16.

In Figs. 1 to 7, inclusive, and Figs. 16 and 17, I have shown a casing 20 adapted for connection with an adding machine 21 provided with the usual keys 22, operating lever 23, and, in the form illustrated, printing sectors 24 with which, in the present adaptation, I connect the parts of my machine which are to be set previous to the lever actuation for printing by the adding machine and for registering the number of highest denominational currency required for the particular amount for which the adding machine had just been set, such as the wage of one of a number of employees, the printing platen of the adding machine being indicated at 25.

Each of certain desired sectors 24, on the side of the adding machine devoted to the lower denominations of currency, is provided with an upwardly directed segment gear four of which, 26, 27, 28, and 29, being shown in Fig. 17, in train with pinions $26^a$, $27^a$, $28^a$ and $29^a$, respectively, upon independently rotatable sleeves $26^b$, $27^b$, $28^b$ and $29^b$ carrying gears $26^c$, $27^c$, $28^c$ and $29^c$ enmeshed with gears $26^d$, $27^d$, $28^d$ and $29^d$ upon the respective rolls 30, 31, 32, and 33, this being one method of adding machine connection and being only for the purpose of illustration, but it will be seen that when one of the four sectors is actuated the corresponding roll 30, 31, 32, or 33 is rotated upon the shaft 34 in the degree of sector movement, in other words, if the sector is moved through one half of its full movement, the roll connected therewith is rotated through 180 degrees of a circle, the train of gears being calculated to produce this result.

The shaft 34 is shown as carried by two end hangers 35 pivoted to the casing at 36 and locked against pendulum movement by means of a stop 37 having a pin 38 engaged in a slot 39 in the lower end of each hanger, said stops being arranged upon a shaft 40 provided with a crank-handle 41 on the outside of the casing, and it will be seen that, if the stops 37 be moved over into their alternate positions, the lower ends of the hangers 35 will be swung toward the rear of the casing and disconnect all the gears on all the rolls 30, 31, 32 and 33 from the respective gears $26^c$, $27^c$, $28^c$, and $29^c$, thereby rendering my attachment inoperable.

The lower ends of the hangers 35 carry a shaft 42 which serves as a pivot for a frame composed of side arms 43 and a longitudinally arranged plate 44 having forwardly directed arms 45 thereon supporting corresponding counters, 46, 47, and 48 in one set, 49, 50 and 51 in another set, 52, 53 and 54 in still another set, and 55 and 56 in a final set, which counters have ratchet wheels $46^a$, $47^a$, $48^a$, $49^a$, $50^a$, $51^a$, $52^a$, $53^a$, $54^a$, $55^a$, and $56^a$, respectively, whereby they may be actuated, and it will be carefully noted that these ratchet-wheels are of different lengths for very important reasons to be explained, and it will be further noted that the last named ratchet-wheel is formed of four spaced members to save cost and weight.

The side arms 43 are normally held in forward positions by means of springs 57 and are adapted to be actuated rearwardly by means of an arm 58 pivoted at 59 and guided by a pin 60 to bear against a collar $23^a$ on the shaft $23^b$ of the operating lever 23 of the adding machine, said collar carrying a tooth $23^c$ for engagement with the end of the arm 58 after the operating lever 23 has been partially moved, and only then, to compensate for the intermediate movements of the parts of the adding machine after key depression and before actual printing. When the side arms 43 are swung upon their pivots the counters 46, 47, etc., as well as their respective ratchet-wheels, are carried rearwardly of the casing 20, but the hangers 35 are not affected because of the locks 37 at their lower ends, and it will be obvious that the counters will be actuated if their ratchet-wheels should encounter any relatively stationary means in such rearward movement, this being the principle upon which my invention, in the form being described, operates.

Figure 1:
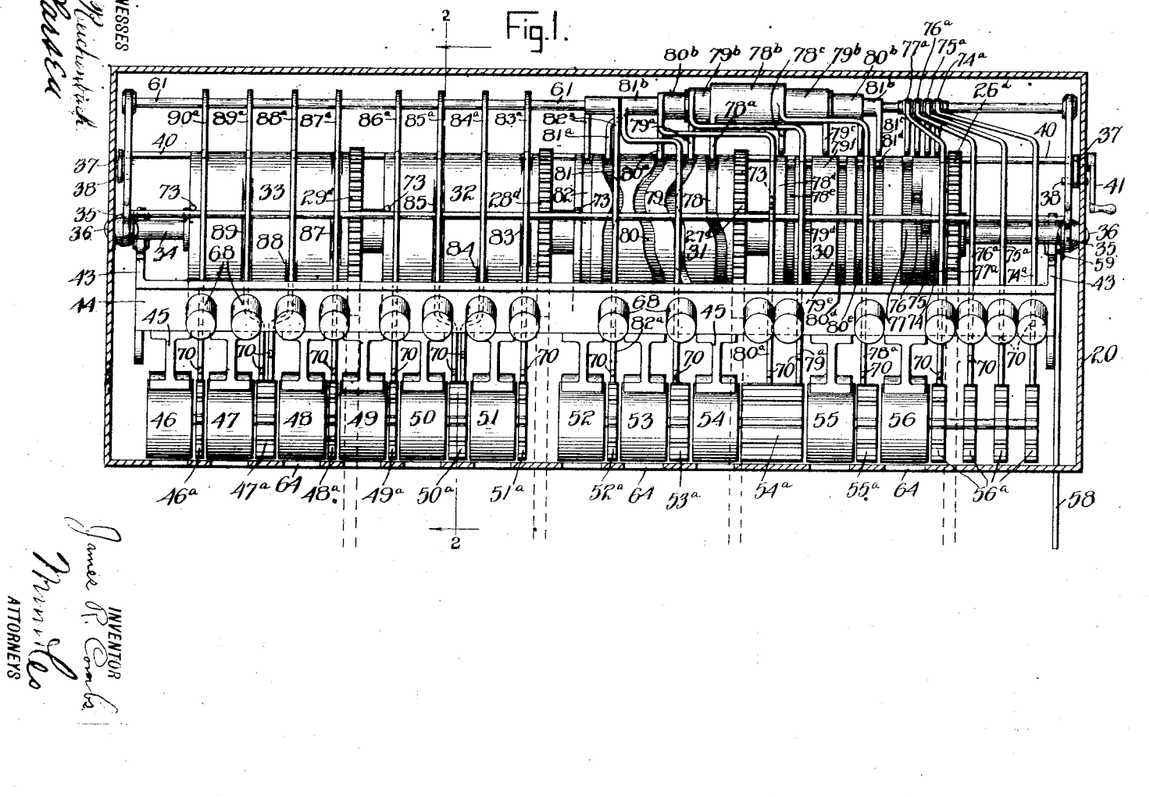
Figure 1 is a sectional plan, as on the line X—X of Fig. 2, of one form of my invention as provided as an attachment to an adding machine.
Figure 2:
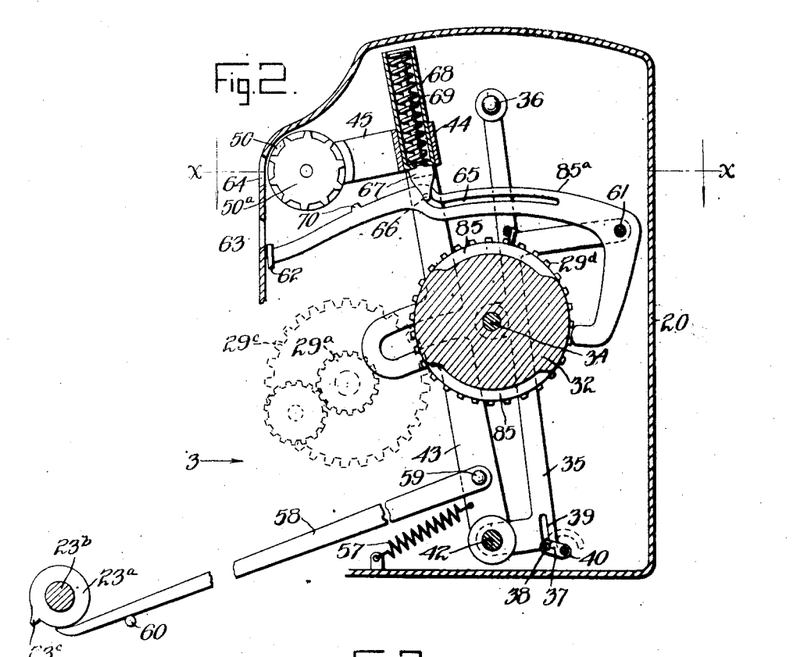
Fig. 2 is a section taken on the line 2—2 of Fig. 1.
Figure 3:
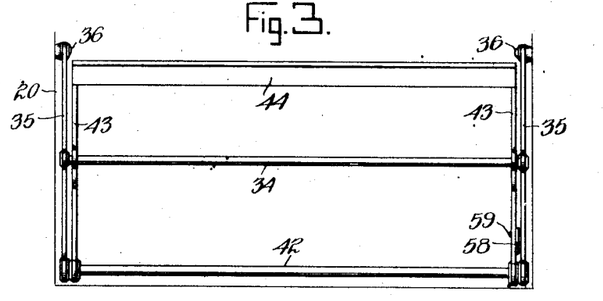
Fig. 3 is a detached view of a roll carrying frame shown in Figs. 1 and 2, on a reduced scale.

The hangers 35 carry a shaft 61 which serves as the fulcrum for a plurality of bell-cranks independently rotatable thereon, which bell-cranks are not all alike and will be described by sets and also individually, but one feature common to all is best shown in Fig. 2 which includes a suitably numbered plate 62 adapted, when the bell-crank has been actuated, to be read at a window 63, a similar window 64 being provided for each of the counters, and not only may the total on the counters thus be read, but the number formed by the numerals on all the actuated bell-cranks may also be read, this number being the equivalent of one of the payments in a pay-roll, in that it indicates the number of each of the highest possible notes or coins necessary to make up this particular payment.

Another feature common to all the bell-cranks is that of a cam slot 65 in each of the forwardly directed arms thereof into which projects a pin 66 on the lower end of a plunger 67 vertically movable in a tube 68 and normally held in uppermost position by means of a spring 69, there being one of these spring resisting plungers for each bell-crank, and a still further similarity in the bell-cranks is in their possession, each, of an upwardly directed tooth 70 arranged, when the bell-crank is raised, in the path of rearward movement of the respective ratchet-wheels of the counters 46, 47, etc., for the actuation of said counters corresponding to the bell-cranks so raised.

Figures 5, 6, 7:
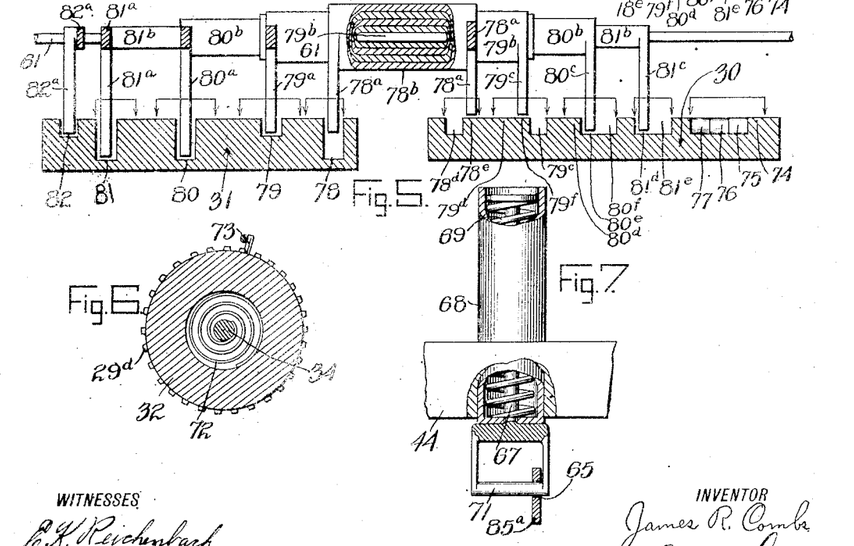
Fig. 5 is an enlarged section taken on the line 5—5 of Fig. 4.
Fig. 6 is a sectional view of one of the rolls to show means for returning a roll to initial position when released from a set position.
Fig. 7 is an enlarged view of a detail, partly broken away, shown in section in Fig. 2.

This pin 66 may, instead, be a stirrup 71 as shown in Fig. 7, whereby the bell-cranks may be moved laterally without becoming disengaged from their respective plungers 67, such bell-crank movement occurring in one of the sets thereof. By reference to Fig. 6 a feature common to all the rolls or drums 30, 31, 32 and 33 will be noted, the coil spring 72 for returning each drum to initial position when permitted to do so, and the stop 73 for preventing movement past initial position, this being the zero position of each drum; as long as the gears of the drums are in operative connection with the sectors 24 no need exists for these parts, but when the drums are thrown out of operative positions by disengaging the gears as hereinbefore described, it is necessary that the drums be at zero positions when they return to operative positions through reëngagement with the sectors for the reason that said sectors always return to zero positions after printing.

The drum 30 is provided with peripheral hill and dale cams on lines 74, 75, 76 and 77 with the respective ones of which bell-cranks 74$^a$, 75$^a$, 76$^a$, and 77$^a$, operate, said drum also having other cams operating in conjunction with those on the drum 31 or in opposition thereto.

The drum 31 is provided with cam grooves 78, 79, 80, and 81, each of which is both hill-and-dale and zigzag, with the respective ones of which bell-cranks 78$^a$, 79$^a$, 80$^a$, and 81$^a$ carried by sleeves 78$^b$, 79$^b$, 80$^b$, and 81$^b$, nested one within another and independently rotatable. The drum 31 is provided with another cam groove 82 which is hill-and-dale only, and with which a bell-crank 82$^a$ operates and the other end of which bell-crank is adapted for engagement with the ratchet-wheel 52$^a$ of the counter 52. The bell-crank 81$^a$ is adapted to actuate the ratchet-wheel 53$^a$ of the counter 53 and which ratchet-wheel is made of a length sufficient to permit the lateral movement of this bell-crank. The bell-crank 80$^a$ is adapted to operate the ratchet-wheel 54$^a$ of the counter 54, as is also the bell-crank 79$^a$, this ratchet-wheel being of considerable length to permit this double engagement therewith and the lateral movement of the said bell-cranks independently of each other, and it will be noted that the teeth 70 of these bell-cranks are not in like positions, the tooth of the bell-crank 80$^a$ being somewhat in advance of the tooth on the bell-crank 79$^a$ whereby, in the rearward swing of the counter carrying frame the ratchet-wheel 54$^a$ will be actuated one degree by the bell-crank 80$^a$ and afterward actuated another degree by the bell-crank 79$^a$ assuming that both bell-cranks are in ratchet-wheel operating positions. The bell-crank 78$^a$ is adapted to actuate the counter 55 through the ratchet-wheel 55$^a$ which is of sufficient length to permit lateral movement of this bell-crank. The bell-cranks 74$^a$, 75$^a$, 76$^a$ and 77$^a$ are adapted to actuate the ratchet-wheel 56$^a$ of the counter 56, this wheel being composed of four parts for reducing the cost and weight if made of one piece, and it will be noted that the teeth 70 on these bell-cranks are arranged in steps on the successive bell-cranks, whereby, if all are in ratchet operating positions, the bell-crank 77$^a$ will actuate the counter one degree, the bell-crank 76$^a$ another degree, the bell-crank 75$^a$ a third degree, and the bell-crank 74$^a$ a fourth degree, thus indicating four cents on the counter 56, this being the penny counter.

The sleeve 78$^b$ carries an arm 78$^c$ at its opposite end operating with two hill-and-dale grooves 78$^d$ and 78$^e$ on the drum 30, this arm being held inactive by the arm of this bell-crank 78$^a$ in the groove 78, in other words, if either arm is on a hill the other arm cannot enter a dale of the respective cam grooves, and the zigzag groove 78 is adapted to move the arm 78$^c$ from one cam groove 78$^d$ and 78$^e$ to the other, in the rotation of the drum 31. This is the five cent bell-crank and unless both of the drums 30 and 31 are in proper positions the arms of the bell-crank cannot move toward the axis of the said drums and the forwardly directed arm having the slot 65 therein is prevented from rising to reveal the plate 62 at the window 63.

The bell-crank sleeve 79$^b$ carries an arm 79$^c$ at its opposite end which is adapted to enter either of two cam grooves 79$^d$ or 79$^e$ or to ride on a line 79$^f$ of the drum 30 according to the position of the zigzag groove 79, and this bell-crank cannot be moved on its pivot until both drums are in proper positions. This is one of the ten cent bell-cranks, the other of which is the bell-crank 80$^a$ and to the opposite end of the sleeve 80$^b$ of which is secured an arm 80$^c$ operating with one or the other of three hill-and-dale cam grooves 80$^d$, 80$^e$, and 80$^f$ in the drum 30, according to the lateral actuation of this bell-crank by the zigzag groove 80, and this bell-crank cannot be moved upon its pivot until the drums 30 and 31 are in proper positions. It will be noted that if one of these ten cent bell-cranks is in position to be rocked the tooth thereon will rotate the counter through one degree, whereas if both bell-cranks be in such position with respect to the cams in the two drums 30 and 31 then the counter will be actuated through two degrees, amounting to twenty cents on the counter 54, the dime counter.

The bell-crank sleeve 81$^b$ carries an arm 81$^c$ at its opposite end adapted to enter either of two hill-and-dale grooves 81$^d$ and 81$^e$, according to the lateral displacement of the bell-crank by the zigzag groove 81, and the bell-crank 81$^a$ is held against rocking on its pivot until both drums 30 and 31 are in proper positions, this being the twenty-five cent, or quarter, bell-crank. The bell-crank 82$^a$ is the fifty cent, or half, bell-crank and may be rocked on its pivot when the drum 31 is in proper position, irrespective of the drum 30.

The drum 32 is provided with four hill-and-dale cam grooves 83, 84, 85, and 86, with which bell-cranks 83$^a$, 84$^a$, 85$^a$, and 86$^a$, operate, these being the one dollar, a two dollar, another two dollar, and a five dollar, respectively, and it will be noted that the teeth 70 on the two two dollar bell-cranks are stepped with respect to each other, whereby, if both are in rocked positions, the counter 50 will be actuated through two degrees, thereby making four dollars jointly.

The drum 33 is provided with four hill-and-dale cam grooves 87, 88, 89, and 90, with which bell-cranks 87$^a$, 88$^a$, 89$^a$, and 90$^a$, operate, these being the ten dollar, a twenty dollar, another twenty dollar, and a fifty dollar, bell-cranks respectively and adapted to actuate the corresponding counters 48, 47, and 46, and it will be noted that the two twenty dollar bell cranks are both adapted to actuate the counter 47 if in rocked position, thereby making forty dollars jointly.

The principle is the same for all the bell-cranks, the ability to rock because of the presence of a dale in the cam grooves in the path of movement of the lower arm thereof toward the axis of the respective drum, for it will be obvious by an inspection of Fig. 2 that such rocking is prevented in the event of a hill of the cam being in the path of movement of the respective bell-crank and, when a bell-crank is rocked, the tooth thereof, 70, will engage with the respective ratchet-wheel and turn the counter connected with this ratchet-wheel the distance of one tooth on said ratchet-wheel. By an inspection of Figs. 1, 4, and 5, it will be seen that the grooves 78, 79, 80, 81, and 82 are continuous, although there is no necessity for the last named being continuous inasmuch as no lateral play of the bell-crank 82$^a$ is intended, whereas the remaining cams are formed by hills on the peripheries of the respective drums and by grooves cut therein to form the dales, and the respective bell-cranks are thus in constant engagement with these continuous grooves 78, 79, 80, 81 and 82, but not with the cams on the drum 30.

Figure 4:
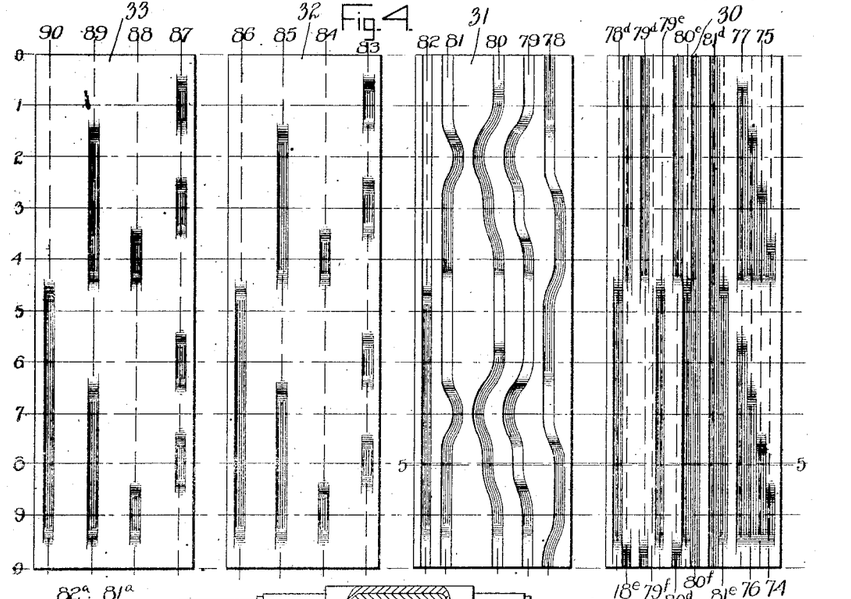

When the keys of the four rows to the right of the key-board of the adding machine are individually depressed, the four drums are correspondingly rotated; if the nine key in the fourth row be depressed the drum 33 is rotated to bring the broken line 9 thereof, Fig. 4, to position beneath the lower ends of all the bell-cranks of this drum; this provides a dale in the cams 90, 89, and 88, but not of the cam 87 which presents a hill, and when the counter carrier is forced rearwardly in the actuation of the operating lever 23 the bell-cranks 90$^a$, 89$^a$ and 88$^a$ may be rocked but not the bell-crank 87$^a$, these being the fifty dollar and the two twenty dollar bell-cranks operable to constitute nine but not the ten dollar bell-crank, 87$^a$, and the counters 46 and 47 are thus actuated one degree and two degrees respectively, but no actuation of the counter 48 occurs.

When the counter carrier is forced rearwardly the pin 66 or stirrup 71 of all the plungers 67 tend to rock all the bell-cranks because of the cam slots 65 therein but if the position of the cam 87 precludes the rocking of the bell-crank 87$^a$ the spring 69 of the corresponding plunger permits the latter to descend and follow the cam slot without interfering with the counter carrier movement and without effect on the bell-crank 87$^a$. When a bell-crank is so rocked the tooth 70 thereof is in the path of movement of the respective ratchet-wheel and the counter thereof is actuated in the rearward movement of the counter carrier, but when a bell-crank is not so rocked the tooth thereof is below the path of movement of the respective ratchet-wheel and the counter thereof is not actuated.

When the drum had been rotated to the 9 line, as stated, and the lever 23 operated, the fifty dollar counter 46 had thus been actuated one degree, and the twenty dollar counter 47 had been actuated two degrees by the two bell-cranks 89ª and 88ª, but the ten dollar counter 48 remained as it was.

This is equally true of the drum 32 which is exactly like the drum 33 and, if this drum had been moved to the line 8 by the third row key 8 of the adding machine, the counter 49 is actuated one degree for five dollars, the counter 50 one degree for two dollars, and the counter 51 one degree for one dollar, constituting eight dollars, because the dales of the respective cams permit the rocking of the respective bell-cranks, but the bell-crank 84ª had not been permitted to rock with the result that there was no second actuation of the counter 50.

If the second row nine key of the adding machine had been depressed the drum 31 would have carried the line 9 to position beneath the respective bell-cranks, the dale of the groove 82 permitting the bell-crank 82ª to rock to actuate the fifty cent counter 52 one degree; the dale in the cam 81 permits the bell-crank 81ª to rock and, because of the fact that the zigzag of this groove has moved the said bell-crank laterally to the left, the arm 81ᶜ was permitted to move into the dale of the cam 81ᵈ which is continuous and of even depth throughout, and the twenty-five cent counter 53 was actuated one degree; the dale of the cam 80 permits the bell-crank 80ª to rock and this is not prevented by the arm 80ᶜ for the reason that the zigzag of the groove 80 had moved said bell-crank laterally to the right whereby the arm 80ᶜ could sink into the dale of the cam 80ᶠ, this being really a continuous groove of even depth but is referred to as a cam for the sake of uniformity, as is also the groove 81ᵈ, and the counter 54 was actuated one degree to register one ten cent piece; the dale of the cam 79 at this time permitted the rocking of the bell-crank 79ª but, as the zigzag thereof had moved said bell-crank laterally to the right, the arm 79ᶜ was prevented from inward movement because of the hill of the cam 79ᵉ, it being understood that the readings on the drum 30 are made at this time on the zero line for the reason that this drum had not been moved as yet, and a second actuation of the ten cent counter 54 was prevented; the dale of the cam 78 permitted rocking of the bell-crank 78ª, as did also the right hand lateral position of the arm 78ᶜ thereof directly over the dale of the cam 78ᵉ, and the five cent counter 55 was thus actuated one degree.

We now have ninety-eight dollars and ninety cents registered on the adding machine, and we have one fifty dollar note, two twenty dollar notes, one five dollar note, one two dollar note, a one dollar note, a fifty cent piece, a twenty-five cent piece, a ten cent piece, and a five cent piece, registered on the corresponding counters.

If now the three key in the first row of the adding machine be depressed, the drum 30 rotates to carry the line 3 thereon to a point beneath the respective bell-cranks and the bell-cranks 77ª, 76ª, and 75ª may rock because of the dales of the cams 77, 76, and 75 thereunder, thus causing the ratchet-wheels 56ª to rotate three degrees by means of the teeth 70 on these bell-cranks, and we have three pennies indicated on the counter 56, but the bell-crank 74ª could not rock because of the hill of the cam 74 thereunder, and continued adding machine manipulation for the individual sums in a pay-roll will actuate the corresponding counters of my invention to register the number of notes and coins required for each amount, as added to the preceding total, whereas the plates 62 on the corresponding bell-cranks will indicate the notes and coins required for the particular amount being registered on the adding machine.

What my invention actually does is to divide the numeral on a depressed adding machine key into its greatest component notes and coins for a particular numeral or for each of the digits forming a number or amount; in other words, any digit of any number is automatically divided into the fewest monetary notes and coins necessary to make up the amount of the number, instead of, as in at least one machine now known to me, requiring a distinct key for each number of two or more digits.

Figure 8:
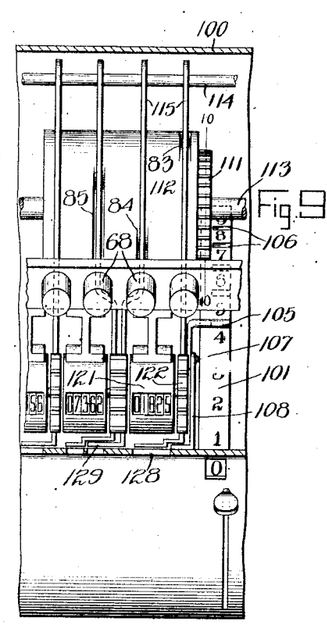
Fig. 8 is a view similar to Fig. 2 but showing one arrangement of parts for a self-contained machine independent of an adding machine, and employing rolls similar to those shown in Figs. 1 and 2.
Figures 9, 10:
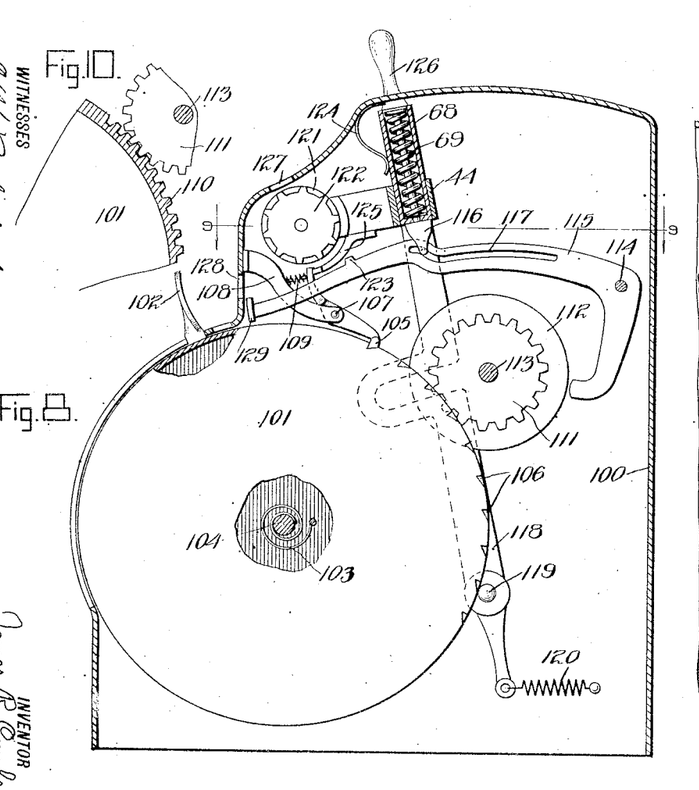
Fig. 9 is a section taken on the line 9—9 of Fig. 8.
Fig. 10 is a section taken on the line 10—10 of Fig. 9.

As shown in Fig. 8, I may provide my invention in the form of a complete machine not intended for attachment to an adding machine, this form consisting of a casing 100 provided with a rotatable disk 101 bearing consecutive numerals on the edge thereof from zero to nine, and manipulated by means of a handle 102 against the action of a coil spring 103 on the shaft 104 thereof and adapted to be locked in a set position by means of a pawl 105 engaging ratchet teeth 106 on the disk, said pawl being pivoted at 107 to an arm 108 and normally held against the disk by means of a spring 109. The disk 101 carries a gear 110 which is enmeshed with a pinion 111 secured to a drum 112 rotatable on a shaft 113 and having cams or grooves therein similar to those already described, any desired number of the said units just described being provided.

A fixed shaft 114 carries a complemental number of bell-cranks only one of which is shown at 115 in all respects similar to those already described, and similar plungers 116 are engaged with cam slots 117 in said bell-cranks, for rocking the same when permitted to do so, said plungers being carried in a frame 118 pivoted at 119 and normally held in forward position by means of a spring 120. The frame 118 also carries a corresponding number of counters 121 rotated by means of ratchet-wheels 122 through the medium of the teeth 123 on the respective bell-cranks. The frame is yieldingly resisted by means of a spring 124 and carries an arm 125 beneath each of the counters and adapted for engagement with the free end of the pawl 105 to release the same after the frame 118 has been manually moved rearwardly by means of a handle 126 and the handle released to permit the spring 120 to return the frame to normal position.

Suitable windows 127 are provided for the counters and windows 128 for the plates 129 on the ends of the bell-cranks, the operation of this form being similar to the operation described with respect to the first form, and need not be repeated.

Figure 11:
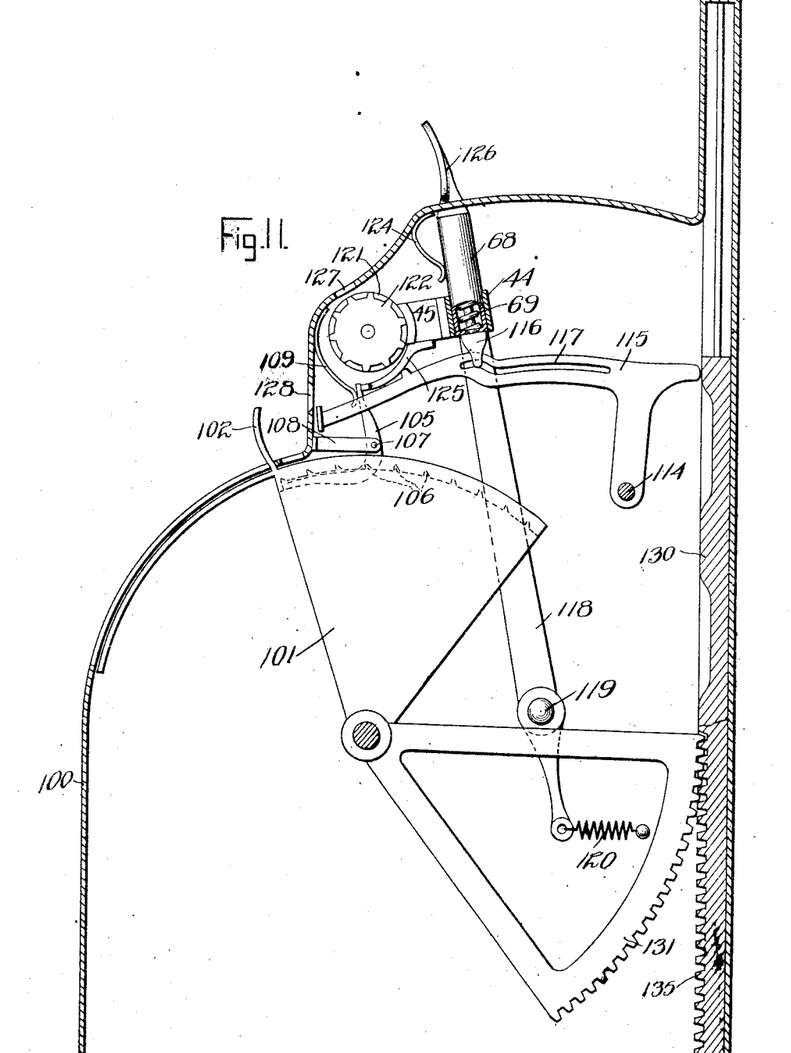
Fig. 11 is a view similar to Fig. 2, but showing cam-bearing plates instead of the rolls.

In Fig. 11 is shown a form in all respects similar to that last described with the exception that I herein substitute cam-bearing plates 130 vertically movable into set positions by means of a segment gear 131 operated by the handle 102, the several bell-cranks being prevented from rocking by the hills of the cams in or on said plates 130, and it will be understood that I may employ as many of the units shown in Fig. 11 as desired, four being sufficient when my machine is designed for making up pay-rolls.

Figure 12:
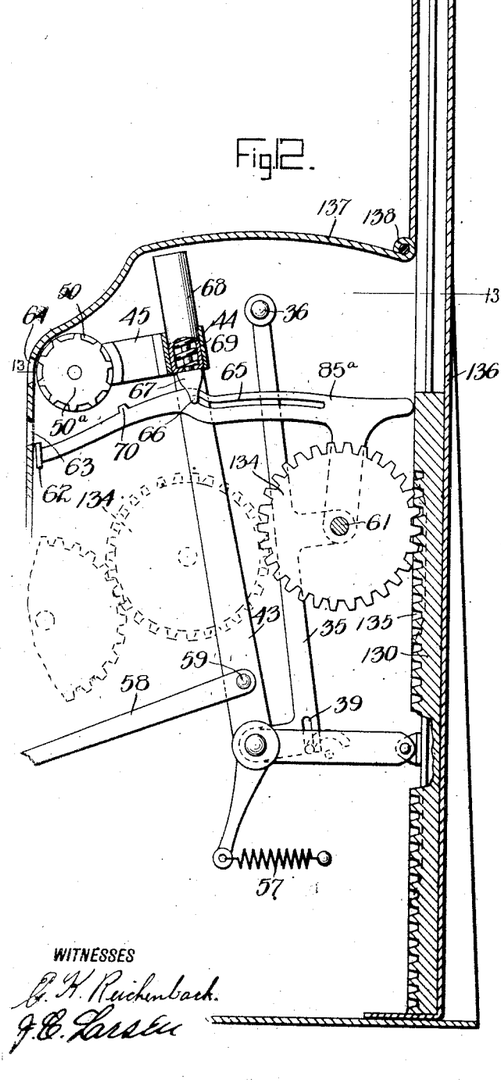
Fig. 12 is a view similar to Fig. 11 but showing the cam-bearing plate form of machine as an attachment to an adding machine.
Figure 13:
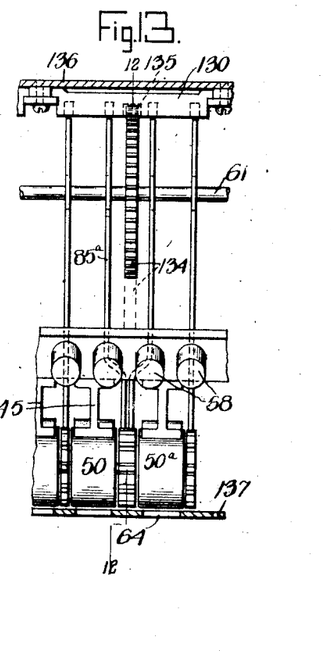
Fig. 13 is a section taken on the line 13—13 of Fig. 12.

In Figs. 12 and 13 I have shown the cam-bearing plates 130 in an attachment for adding machines and in which I employ a train 134 of gears in operative connection with the sector or other element of the adding machine and with a rack-bar 135 on the plate 130 for each unit of my machine; it is not deemed necessary to go into detail as the construction and operation will be obvious from the foregoing descriptions, but in this form the entire back 136 of the casing 137 is hinged at 138 and is adapted to be swung rearwardly to disengage the train of gears from the rack-bar of each plate 130, the side walls of the casing being extended to inclose the movable back in its rearward position, the means for moving the back being similar to the means shown for swinging the hangers 35 in the first described form.

Figure 14:
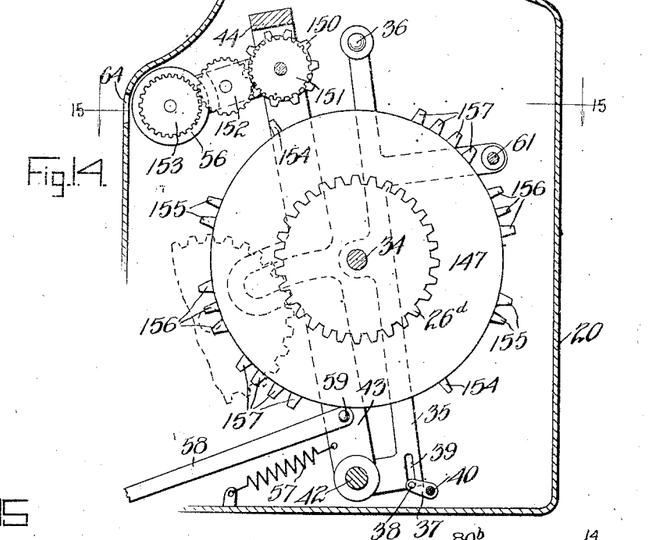
Fig. 14 is a view similar to Fig. 2 but showing toothed wheels instead of certain of the cam-bearing rolls.
Figure 15:
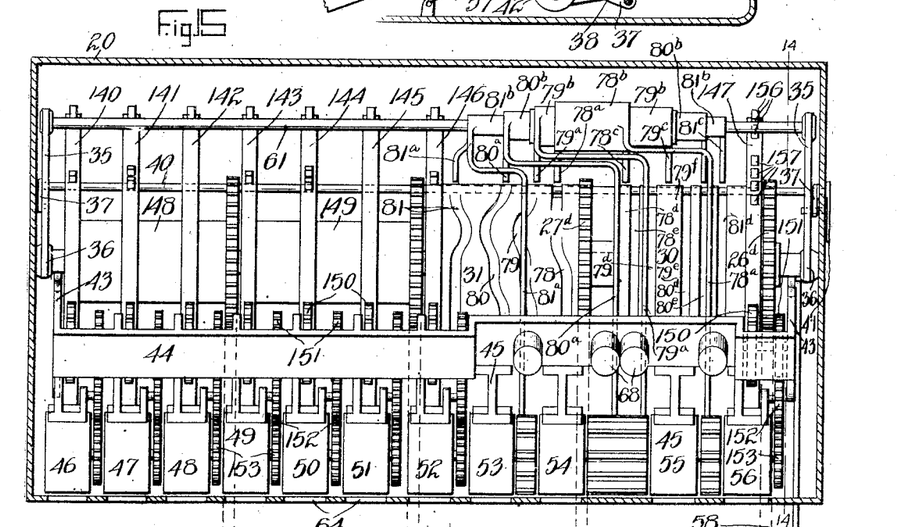
Fig. 15 is a section taken on the line 15—15 of Fig. 14.

In Figs. 14 and 15 I have shown a modification wherein toothed disks 140, 141, 142, 143, 144, 145, 146 and 147 replace the bell-cranks 90ª, 89ª, 88ª, 87ª, 86ª, 85ª, 84ª, 83ª and 82ª and the drums 33, 32, and the part of the drum 31 bearing the cam 82, as well as the bell-cranks 77ª, 76ª, 75ª, and 74ª, and the part of the drum 30 bearing the cams 77, 76, 75, and 74, but I will retain the bell-cranks 81ª, 80ª, 79ª, and 78ª and related parts described with reference to the first form, as well as similar means for adding machine connection. The disks 140, 141 and 142 are carried upon a sleeve 148 and constitute the fifty dollar, the twenty dollar, and the ten dollar counter actuating means, respectively. The disks 143, 144, 145, are carried upon a sleeve 149 and constitute the five dollar, the two dollar, and the one dollar counter actuating means, respectively. The disk 146 is carried by the drum 31 and is the fifty cent counter actuating means, and the disk 147 is carried by the drum 30 and is the penny counter actuating means, a suitable number of suitably spaced teeth being provided for the said disks, only one of which, the penny counter actuator, will be explained in detail.

The disks and drums are mounted upon the shaft 34 as in the form first described but the zero position of each disk is at the top thereof in the vertical plane of the axis thereof, whereas the zero positions of the drums are at a point in line with the lower ends of the respective bell-cranks, this, however, being arbitrary and subject only to the details of construction of the machine.

The counter carrier 44 is provided, in the position of each disk, with a spur-gear 150 which, by means of a gear 151 and idle pinion 152, is enmeshed with a gear 153 on the counter, 56 in the present showing in Fig. 14, and it will be seen that actuation of the spur-gear 150 correspondingly affects the said counter. The disk 147 is provided with a single tooth 154 in each of two positions, a pair of teeth 155 in each of two positions, three teeth in a set, 156, in each of two positions, and with four teeth in a set, 157, in each of two positions, similar sets being shown as at diametrically opposite points.

When an adding machine key is depressed the complemental disk is set and, when the operating handle 23 is actuated, the counter carrying frame 44 is swung rearwardly as in the form first described. Assuming that the "one" key of the adding machine in the extreme right hand row of keys is depressed; the disk 147 is rotated to carry the single tooth 154 at the upper side thereof into the vertical axial plane of the disk and at the top thereof whereby said tooth will be in the rearward path of movement of the spur-gear 150, and said spur-gear will be rotated through one degree with a corresponding actuation of the counter 56 of one degree or point, the counter being free to rotate backwardly without registering in the return of the carrier 44 to initial position.

If two teeth of the disk are carried into set position, the counter will be actuated two degrees, three degrees for three teeth set position, and four degrees for four teeth set position, four pennies being the greatest number registered as five cents are registered by the five cent counter.

One disk 141 replaces the two bell-cranks actuating the twenty dollar counter, and one disk 144 replaces the two bell-cranks actuating the two dollar counter in the form first described and, as stated, I may arrange the teeth on the disks to meet conditions.

While several apparently different forms are shown and described, they are all really the same in principle, both as to the broad idea of the invention, and as to the use entirely or in part of the bell-cranks and the cam-bearing elements, the broad idea being, as will have been gathered from the foregoing, the translation of any of the several values of each digit, of a selective numeral, on selective manipulative elements, into the equivalent monetary denominations, and it will be obvious that still other forms might be conceived which would be within the spirit of the invention, and the scope of the appended claims.

Having fully described my invention, what I claim as new, and desire to secure by Letters Patent, is:—

1. The combination with a plurality of manipulative elements bearing the specific values of each digit of a number, of means including movable members having interrupted grooves arranged in a plurality of spaced lines for translating the value of a manipulation of any of said elements into the equivalent monetary denominations.

2. The combination with a plurality of manipulative elements bearing the specific values of each digit of a number, of means including movable members having interrupted grooves arranged in a plurality of spaced lines for translating the value of a manipulation of any of said elements into the fewest monetary denominations.

3. The combination with a plurality of manipulative elements bearing the specific values of each digit of a number, of a counter for each of a plurality of monetary denominations, and means including movable members having interrupted grooves arranged in a plurality of spaced lines for translating the value of a manipulation of any of said elements into the fewest monetary denominations on the respective counters.

4. The combination with a plurality of manipulative elements bearing the specific values of each digit of a number, of a counter for each of a plurality of monetary denominations, interposed grooved members movable into each of a plurality of definite positions by a manipulation of the respective elements, and means for operatively connecting said interposed grooved members and respective counters to translate the value of a manipulation of any of said elements into the fewest monetary denominations on the respective counters.

5. The combination with a plurality of manipulative elements individually marked to represent each value of each digit of a number, of means including movable members having interrupted grooves arranged in a plurality of spaced lines for translating the value of a manipulation of any of said elements into the fewest monetary denominations.

6. The combination with a plurality of manipulative elements bearing the specific values of each digit of a number, of a grooved member for each digit, a counter for each of a plurality of monetary denominations, a bell-crank for each counter normally out of engagement therewith and controlled by the respective grooved member, and means controlled by said elements for moving said grooved members to permit the operative connection of said bell-cranks with their respective counters.

7. The combination with a plurality of manipulative elements bearing the specific values of each digit of a number, of a grooved member for each digit, a counter for each of a plurality of monetary denominations, a bell-crank for each counter and normally out of engagement therewith and controlled by the respective grooved member, means controlled by said elements for moving said grooved members to permit such engagement, and means for effecting such engagement when said grooved members permit said bell-cranks to move.

8. The combination with a plurality of manipulative elements bearing the specific values of each digit of a number, of a counter for each of a plurality of monetary denominations, a carrier for all of said counters, means for moving said carrier, a bell-crank for each counter and normally out of engagement therewith, means for preventing such engagement, and means controlled by said elements for rendering selected ones of said preventive means inoperative to permit movement of the respective bell-cranks to engage with the respective counters.

9. The combination with a plurality of manipulative elements bearing the specific values of each digit of a number, of a counter for each of a plurality of monetary denominations, a bell-crank for each counter and normally out of engagement therewith, cam means controlled by said elements for permitting such engagement, and means for effecting such engagement of the free bell-cranks with their respective counters.

10. The combination with a plurality of manipulative elements bearing the specific values of each digit of a number, of a counter for each of a plurality of monetary denominations, a bell-crank for each counter and normally out of engagement therewith, drums provided with hill-and-dale cams for preventing and for permitting such engagement under the control of said elements, and means for effecting the engagement of the free bell-cranks with the respective counters to actuate the latter.

11. The combination with a plurality of manipulative elements bearing the specific values of each digit of a number, of a counter for each of a plurality of monetary denominations, a bell-crank for each counter, drums provided with hill-and-dale and zigzag cams for normally holding said bell-cranks out of engagement with the respective counters, and for permitting such engagement, said drums being under the control of said elements, and means for effecting such engagement of the free bell-cranks with the respective counters to actuate the latter.

12. In a machine of the class described, a cam bearing element, a bell-crank pivoted adjacent thereto and provided with one arm bearing against said element and with a toothed arm, a counter adapted to be engaged with said toothed arm, and means for effecting such engagement when a cam on said element permits said bell-crank to rock on its pivot.

13. In a machine of the class described, an element provided with combined hill-and-dale and zigzag cams, a supplemental element provided with hill-and-dale cams, a shaft, a bell-crank rotatably and slidably mounted on said shaft provided with an arm bearing on said first named element, a supplemental arm bearing against said supplemental element, and a toothed arm, a counter adapted to be engaged by said toothed arm, and means for effecting such engagement when said bell-crank is permitted to rock on said shaft, said rocking being permitted when said elements are moved to carry dales of the respective cams beneath the two first named arms of said bell-crank, said first named arm being in constant engagement with said first named element.

14. The combination with a plurality of manipulative elements bearing the specific values of each digit of a number, of a counter for each of a plurality of monetary denominations, a member for each digit provided with a groove for each monetary denomination and operable into definite positions by the respective manipulative elements, a bell-crank for each counter normally out of engagement therewith and controlled by the respective grooved member, and means controlled by said manipulative elements for moving said grooved members to permit the operative connection of said bell-cranks with the respective counters.

15. The combination with an adding machine provided with a plurality of manipulative elements bearing the specific values of digits of a number, with members moved into set positions by the manipulation of the respective elements, and with an operating lever, of an attachment comprising means including individually movable members having interrupted grooves arranged in a plurality of spaced lines for translating the value of a manipulation of any of said elements into the fewest monetary denominations.

16. The combination with an adding machine provided with a plurality of manipulative elements bearing the specific values of digits of a number, with members moved into set positions by the manipulation of the respective elements, and with an operating lever, of an attachment comprising means including a grooved member for each digit movable into any of a plurality of definite positions in operative connection with the respective members adapted to be set for translating the value of a manipulation of any of said elements into the fewest monetary denominations upon the actuation of said operating lever.

17. The combination with a plurality of manipulative elements bearing the specific values of each digit of a number, of a counter for each of a plurality of monetary denominations, an actuator for each counter normally out of engagement therewith, means movable by the respective manipulative elements and presenting obstructing surfaces at certain positions and interrupted grooves at other positions to prevent and to permit actuator engagement with the respective counters, and means for operatively connecting the respective counters and actuators when such connection is permitted by said grooved means.

18. The combination with a plurality of manipulative elements bearing the specific values of each digit of a number, of a counter for each of a plurality of monetary denominations, cam means for each digit controlled by the respective elements, a bell-crank for each counter controlled by two adjacent cam means to permit engagement thereof with its counter, and means for effecting such engagement when permitted by said cam means.

19. The combination with a plurality of manipulative elements bearing the specific values of each digit of a number, of a counter for each of a plurality of monetary denominations, an actuator for each counter normally out of engagement therewith, means controlled by the elements of one digit for permitting operative engagement of certain of said actuators and counters, and means controlled by the elements of two adjacent digits for permitting operative engagement of certain of said counters and actuators, certain of said means consisting of movable members presenting obstructing surfaces at certain positions and interrupted grooves at other positions to prevent or to permit actuator engagement with the respective counters, and means for effecting such engagement when permitted by said grooved means.

20. The combination with a plurality of manipulative elements bearing the specific values of each digit of a number, of a counter for each of a plurality of monetary denominations, a carrier for all of said counters, a bell-crank for operating each of said counters, means controlled by said manipulative elements for preventing the rocking of said bell-cranks with said preventive means in other than a predetermined position, and means for bringing the respective counters and bell-cranks into operative relationship when permitted by said preventive means.

21. The combination with a plurality of manipulative elements bearing the specific values of each digit of a number, of a counter for each of a plurality of monetary denominations, a carrier for all of said counters, a bell-crank for operating each counter, means controlled by said elements for preventing the rocking of said bell-cranks with said preventive means in other than a predetermined position, and means on said carrier in operative connection with each bell-crank for rocking the same into counter engagement when permitted to do so by said preventive means.

22. The combination with a plurality of manipulative elements bearing the specific values of each digit of a number, of a counter for each of a plurality of monetary denominations, a carrier for all of said counters, a bell-crank for operating each counter, means controlled by said elements for preventing the rocking of said bell-cranks with said preventive in other than a predetermined position, and means on said carrier for rocking said bell-cranks when permitted by said preventive means and yielding in the carrier movement to the bell-cranks not permitted to rock by said preventive means.

In testimony whereof I have signed my name to this specification in the presence of two subscribing witnesses.

JAMES R. COMBS.

Witnesses:
 E. K. REICHENBACH,
 J. C. LARSLEE.

Copies of this patent may be obtained for five cents each, by addressing the "Commissioner of Patents, Washington, D. C."